Sept. 11, 1951  G. B. DAVIS, JR  2,567,188
COFFEE MAKER
Filed Sept. 7, 1945  4 Sheets—Sheet 4

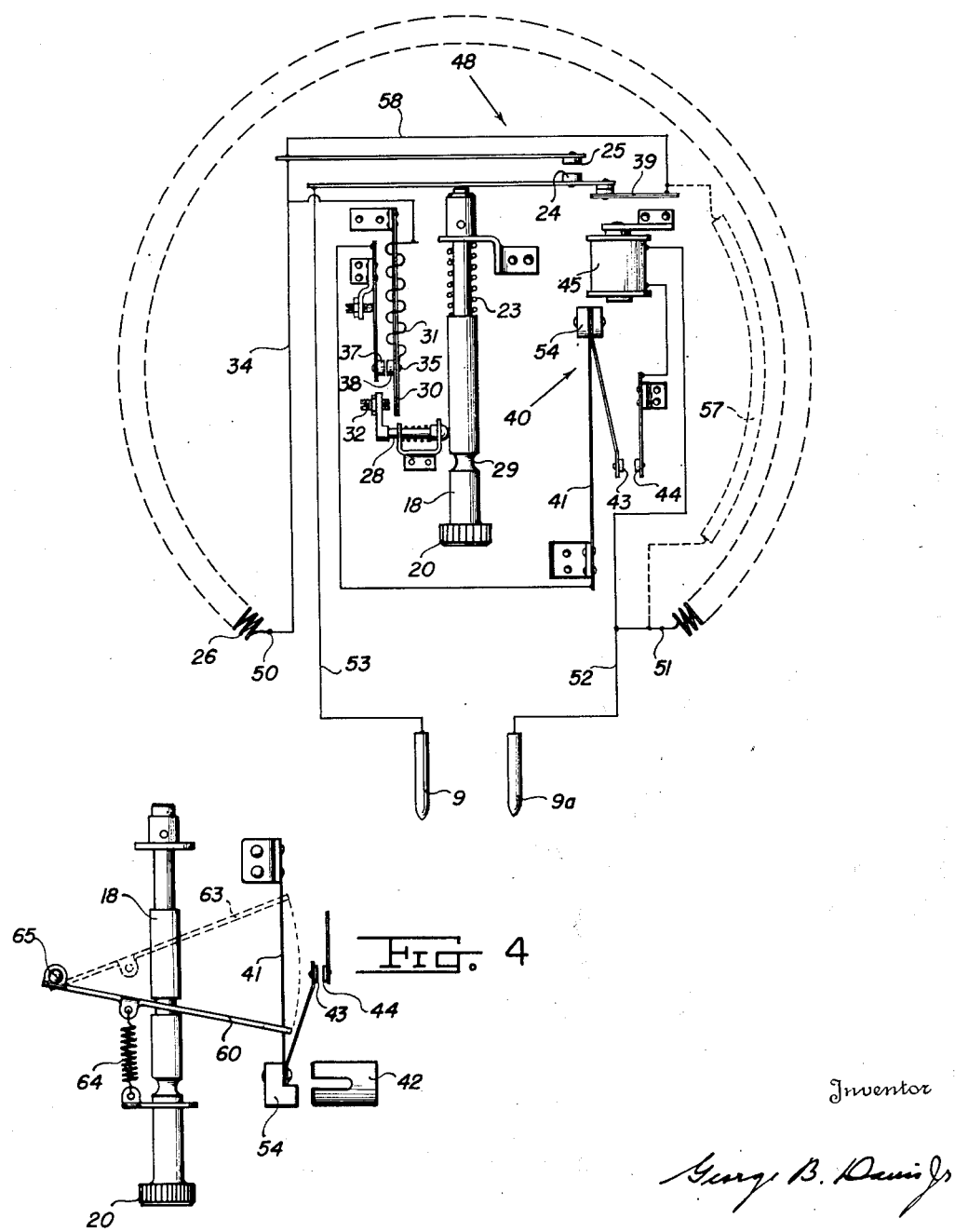

Inventor
George B. Davis Jr.

Patented Sept. 11, 1951

2,567,188

UNITED STATES PATENT OFFICE 2,567,188

COFFEE MAKER

George B. Davis, Jr., Green Acres, Md.

Application September 7, 1945, Serial No. 614,918

2 Claims. (Cl. 99—281)

This invention relates to a coffee maker and more specifically to an automatic coffee maker of the vacuum type and is a continuation-in-part of application No. 542,117.

These coffee makers are provided with coffee steeping and water heating vessels which are in liquid communication with each other.

In coffee makers of this type, it is the usual practice to cut off the heat manually as soon as the water has been transferred from the water heating receptacle to the steeping receptacle. This invention has as one of its objects the provision of an improved control for the type of coffee maker described which renders it completely automatic after the heat has been turned on.

Heretofore, beverage brewers and coffee makers of this type have found considerable favor with the people, but frequently, due to inattention, the user does not promptly shut off the power supplying heat to the device, thereby permitting the lower chamber to run dry. Various methods have been employed to overcome this disadvantage, one of which utilizes the shifting weight caused by the liquid being transferred from one vessel to the other; another provides a thermal control for fitting to or in the upper bowl to be actuated by the presence of the heated liquid forced into this upper container. Most methods depend for their functioning upon specially constructed containers and fittings adapted specifically to their particular control.

It is desired by this invention to provide a coffee maker having a control mechanism responsive to the vibrations present in all such cookers during the last part of the brewing operation and to utilize these vibrating impulses to operate a control for reducing the heat to cause the brew to return to the water heating vessel at the completion of the cooking cycle.

It is also desired here to provide a manually or automatically functional control for the purpose described which may be completely concealed in a base support and adaptable for use with any standard coffee maker of the type designated and which will function consistently irrespective of the quantity or temperature of the liquid used.

Another object of this invention is to provide means for maintaining the brew at a predetermined temperature after the completion of the cooking process.

In order that this invention may be more readily understood reference is made to the accompanying drawings:

Fig. 3 is a circuit diagram of the invention.

Fig. 4 is a plan view of the vibrative arm and securing assembly.

Figure 1:
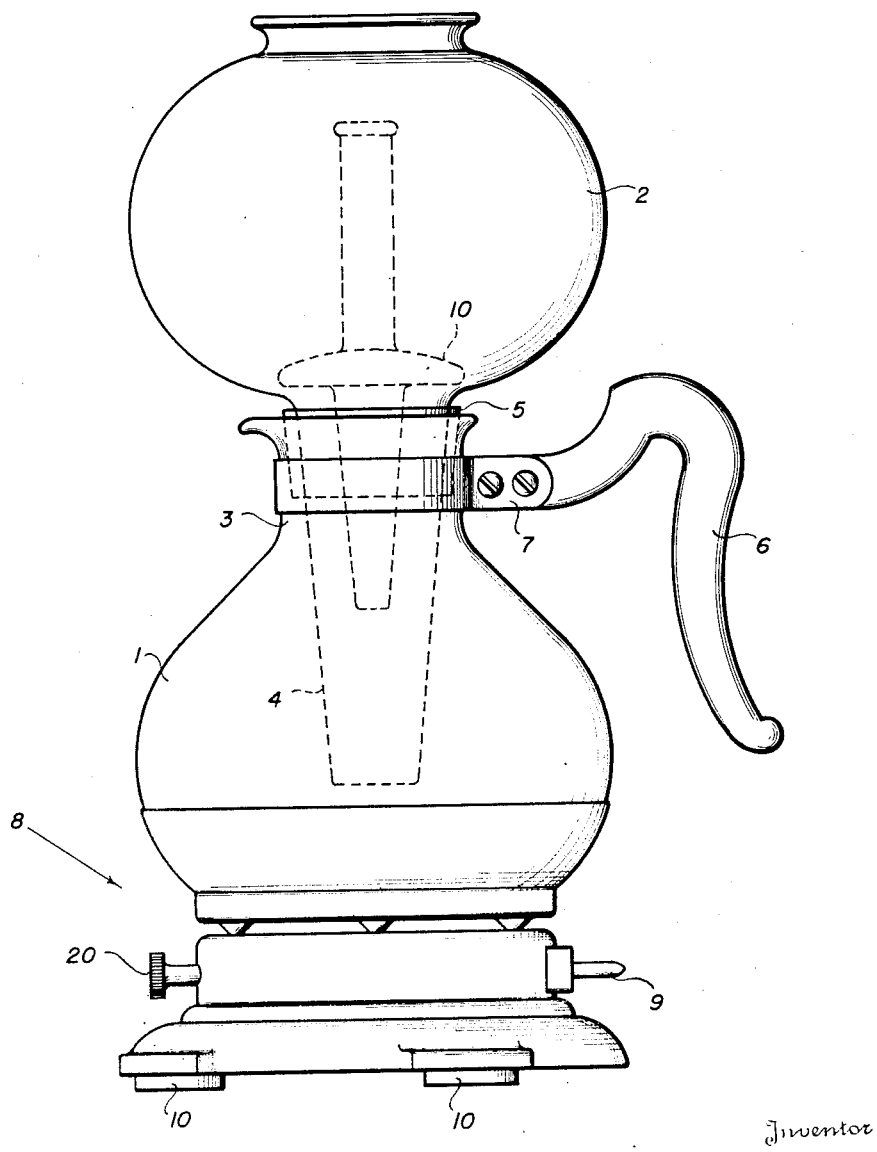
Fig. 1 is a plan view of the invention.

In reference to Fig. 1, this invention is shown as applied to a coffee maker comprising a lower water heating vessel or bowl 1 and an upper coffee infusion or steeping vessel or bowl 2. The lower bowl is provided at its upper portion with an upright neck 3 within which depends the tubular extension 4 which is attached to the lower portion of the upper bowl 1. This extension or tube constitutes a liquid passage way placing the said bowls 1 and 2 in liquid communication.

A suitable gasket or stopper 5, preferably formed of rubber, is inserted in the neck 3 of the lower bowl and is provided with a centrally arranged aperture to receive the extension 4 provided on the upper bowl. The handle 6 is secured to the lower bowl by strap portion 7 which surrounds and grips the neck 3 of this bowl as shown. The upper bowl may be provided with a cover if desired. The support or stand 8 houses a suitable electric heating element and mechanism for controlling the current to the element. This current is supplied through terminal pins 9 which are arranged to receive the usual supply plug of an ordinary supply cord. The feet 10 are preferably of rubber or some other yielding material to give the support a resiliency to a stationary resting surface upon which it may be set.

In the operation of this apparatus, thus far described, it will be understood that coffee grounds will be placed in the infusion receptacle 2 above the filter 10 and that a suitable quantity of water will be placed in the lower bowl 1, heat will then be applied by the heating element. As the water in the lower bowl is heated, a pressure is generated sufficiently great to cause the water in the lower bowl to be forced up through the tube 4 and by, or through, the filter 10 into the upper bowl 2 where the coffee grounds are placed. As long as heat is applied to the lower bowl the water will continue to flow up into the upper bowl until all of the water in the lower bowl, above the level of the lower end of the tube 4, has risen to the upper bowl. The water will remain in the upper bowl to infuse the coffee until the heat is cut off, this permits the lower bowl to cool allowing the water vapor in the lower bowl to condense and thereby reduce the pressure therein sufficiently to cause the coffee brew in the upper bowl to flow down into the lower bowl through the coffee grounds and filter 10 by atmospheric pressure and gravity. After the coffee has been made, the upper bowl may be removed and the coffee brew poured from the lower bowl by means of the handle.

Figure 2:
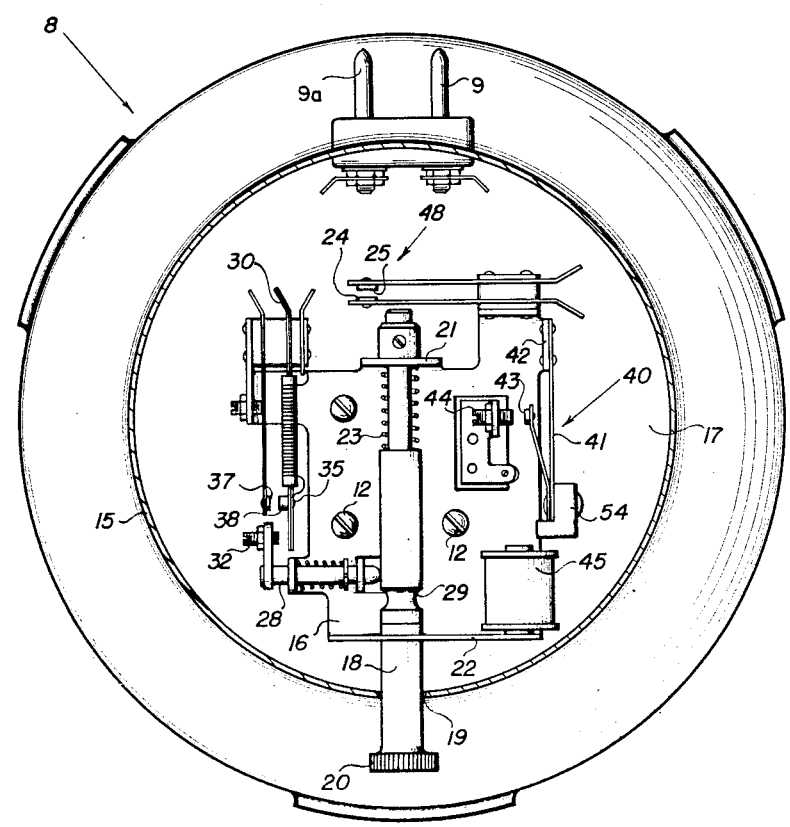
Fig. 2 is a section through the support showing a plan view of the control.

For a better understanding of the device and its operation, reference is made to Fig. 2 and Fig. 3. Fig. 3 is substantially the same assembly and wiring as is shown in Fig. 2. The housing 15, forming the lower portion of the support 8, is shown in section disclosing a plan view of the invention normally concealed therein. The mounting plate 16 is secured to the bottom plate 17 of the support by screws 12 and so positioned that the operating plunger 18 will extend beyond the outer surface of the housing through opening 19 with clearance for the knob 20 to move from its "inoperative" or "out" to its "operative" or "in" position. This plunger is slidably mounted in apertures formed in the flanges 21 and 22 of the mounting plate and so positioned that, when manually forced inward against the return spring 23, the contacts 24 and 25 of the control will be pressed together for closing the circuit through the heating element 26. The plunger is retained in this "operative" or "on" position by the bullet latch 28 connecting with the annular groove 29 formed on the shaft as shown. This type of latch will permit the plunger to be withdrawn manually to its "off" position when desired. Secured at one end to the mounting plate 16 but insulated therefrom is the bi-metallic strip 30 so located that when sufficiently heated by resistor 31 as caused by the completion of the current therethrough as contacts 43 and 44 are closed the free end of the strip will bend outward to engage the set screw 32 to lift the latch 28 for the automatic releasing of plunger 18. This plunger, on being released, is returned to its "off" position by spring 23. The thermal responsive strip 30 is connected with the lead 34 through the resistor 31 but electrically insulated therefrom except at its contact point 35. It is not necessary that the resistor be wound about the strip as shown. The present structure has an advantage, however, in that it permits a more rapid transmission of heat to the responsive element at the time desired for operating the control. The contacts 37 and 38 are closed by heat applied to the strip 30 from the main element 26 during the initial heating of the water in the bowls, thereby providing an interval of time during which no amount of vibration will affect the cutting off of the control mechanism, the set screw 32 permitting adjustment of the space separating the latch and strip 28 and 30 respectively, whereby heat from the main element 26 is not effective to disengage the latch of plunger 18. The spring mounted contact 37 is so positioned that a slight heating of the strip 30 will bring contacts 37 and 38 into engagement for closing the circuit to the vibrative assembly 40. The vibrative contact member 41 is rigidly secured to the flange 42 of the plate and so located that when sufficiently vibrated the floating contact 43 will swing into engagement with the adjustable contact 44 to complete this shunt circuit through the electromagnet 45 effective as the circuit is completed therethrough to attract and hold the weight 54 and thereby prevent separation of the contacts 43 and 44 until resistor 31, now energized in the magnetic circuit, has sufficiently heated the strip 30 for it to disengage the latch 28 of plunger 18 for opening the circuit through the assembly. The main element 26 that serves to heat the water in the said lower vessel is electrically connected in parallel with this shunt circuit and is electrically fed through the control 48.

To set in operation the apparatus thus far described, the plunger 18 of the control 48 is manually forced inward from the "inoperative" or "off" position. This action compresses the spring 23 until the detent or latch 28 has engaged the notch 29 to lock the said plunger in its "operative" or "on" position. This inward movement of the plunger forces the spring mounted contact 24 into circuit closing engagement with the contact 25 permitting current flowing in through the contact pin 9 to pass on to the terminal 50 of the main heating element 26. The other terminal 51 of the heater connects directly with the other contact pin 9a through lead 52 completing the circuit through the element 26 causing it to heat. The hot element boils the water in the aforementioned water heating vessel, and, as formerly explained, causes the greater portion of this heated water to be forced from the lower vessel into the upper or steeping vessel by the internal pressure generated within the lower vessel; it is at this time after the water has been transferred that the escaping gases, still being generated within the heating vessel, force an escape into the suspended liquid in the steeping vessel causing a turbulence in this mass of liquid which shakes and bounces the wheels sufficiently to set up a vibration in the resilient contact arm 41. As the water within the lower vessel is being heated, the thermally responsive strip 30 is also taking on heat and bends outwardly bringing together contacts 37 and 38 to carry the now open current, flowing in through leads 52 and 53, to the contacts 43 and 44. Heat from the main element 26 is at no time sufficient to cause the strip 30 to move to latch operating position for reducing the heat to the vessels, the heat applied to the strip in this manner being effective to cause a delayed closing of the circuit to the vibrator control contacts 43 and 44, thereby preventing foreign vibrations or shock from operating the control prematurely. The arm 41, which has been set in motion, gradually picks up the vibrations set up by the boiling liquid and in a short time develops sufficient momentum as to cause the spring mounted contact 43 in its swinging arc to connect with the contact 44 for closing the circuit through the magnet 45. This magnet, on being energized, magnetically attracts the weight 54 on the arm 41 to stop further vibration and hold the contacts 43 and 44 together until such time as the heater 31, also in this circuit, has heated the thermal responsive strip 30 sufficiently as to cause it to bend out to release the plunger of the control for cutting off the supply of current to the heating element 26. The control 48 also serves to open this shunt circuit allowing the magnet to release the arm 41. The breaking of the circuit through the heater 26 completes the cooking cycle by allowing the liquid, that has been forced into the steeping vessel, to return to the heating vessel where it remains until used.

The bi-metal strip 39 is not required for the normal functioning of the device but serves as an auxiliary control thermally operated by the heat from the element 26 to jump the contacts 24 and 25 of the control for intermittently energizing the element to keep the liquid warm within the heating vessel without raising the temperature of this liquid to the degree of driving it up into the steeping vessel. This strip may be located at any suitable place for properly regulating the temperature of the element 26 or, if desired, may be used to connect in circuit a small auxiliary element as shown by 57. This auxiliary element would, of course, eliminate the connection 58 to the main element.

Fig. 4 shows a method whereby a permanent magnet 42 may be substituted for the electromagnet 45 and will operate to hold contacts 43 and 44 in engagement for operating the thermal strip 30 until such time as the plunger 18 has been released to cut off the current to the heater 26 as heretofore described. By eliminating the electromagnet 45, contact 44 would be connected directly to lead 52. The supporting arm 60 pivots on pin 65 and is operated by the plunger 18 extending through a notch formed in the undersurface of the arm 60 for freeing the weight 54 from the magnet 42 when set for operation. This arm 60 also supports the arm 41 within a second notch formed in the undersurface of the arm 60 when the plunger 18 is in its "inoperative" or "out" position and moves back with the plunger to free the arm for vibrating as shown by 63 when the plunger is forced "in." A support of this nature may be used with an electromagnet hook-up if desired to prevent the arm 41 from becoming damaged from a jar or fall.

Figure 5:
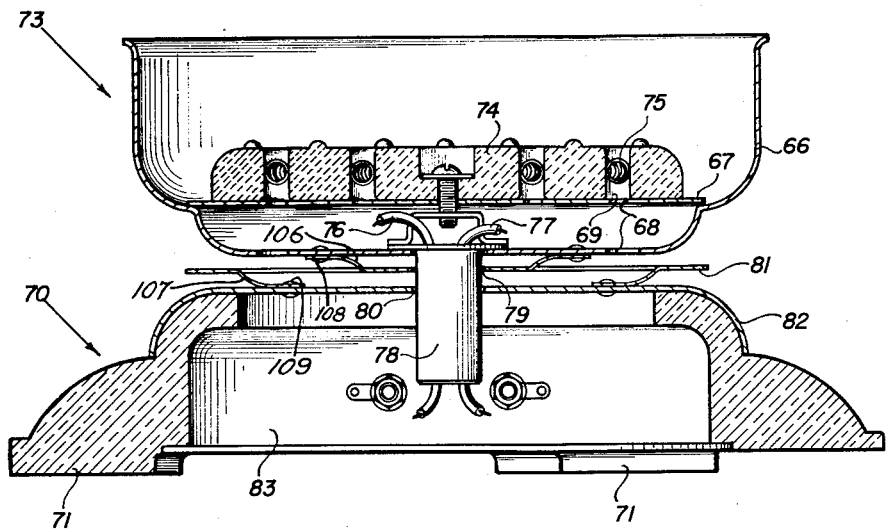
Fig. 5 is a section through an alternate support having a spring mounted top portion.

Fig. 5 is an alternate and more sensitive type of support. The base member 70 is rigidly supported by feet 71 formed in the plastic ring 72 as shown. The resiliently mounted top piece 73 houses the ceramic plate 74 in which is arranged the heating element 75. An electrical connection, as indicated by leads 76 and 77, is made with the terminals of this element through the tubular pendant 78 that extends down through openings 79 and 80 formed in the baffle and plate 81 and 82 respectively. The baffle 81 being preferably formed from tempered spring stock and having struck therefrom a plurality of upwardly and downwardly projecting flexible fingers 106 and 107 respectively, diametrically arranged and adapted for connecting with the housing and plate 108 and 109 respectively, thereby to provide a yieldable support for the top portion 73 upon the base portion 70. The control for regulating the flow of current to the element 75 is preferably located within the compartment 83. The housing 66, along with the supporting plate 67, is perforated at 68 for allowing a circulation of air to pass up through the cut-out sections 69 in the ceramic plate 74 for a more rapid cooling of the element after the completion of a brewing cycle.

Figure 6:
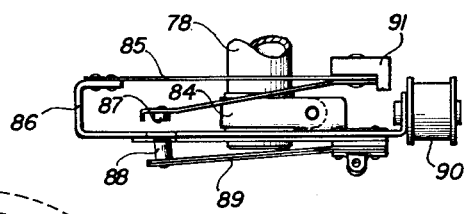
Fig. 6 is a plan view of the vibrating member as connected to the resiliently mounted top portion of the support as shown in Fig. 4.

Fig. 6 shows a variation of the vibrating assembly as connected to the pendant 78 Fig. 5 by means of strap 84. This pendant serves to transmit vibration down into the base to be picked up by the vibrative arm 85 for operating the circuit controller as heretofore described. The arm 85, as shown here, is rigidly secured at one end to the mounting member 86, the other end is left free to swing, when actuated, for bringing the spring mounted contact 87 into engagement with the thermally controlled contact 88 when the latter has been lifted into position by the upward movement of the bimetallic strip 89. The arrangement of strips 89 and the vibratory arm 85 as shown herein may be employed in lieu of the arrangement of contacts 37 and 38 and vibratory assembly 40 of Fig. 3, the strip 89 being adapted for connecting directly to a terminal of the resistor 30, thereby to maintain the circuit to the resistor and the electromagnet 90 open at the contacts 87 and 88 until such time as the contact 87 is allowed to meet contact 88 by the lifting of the rod into position as the strip 89 heats. The magnet 90 is electrically connected in series with these contacts 87 and 88 and by acting on the weight 91 holds them in engagement after once they connect. The thermal responsive element 89 is caused to lift contact 88 into proper position by receiving heat from the element 75 (equivalent to element 26 of Fig. 3) during the first stage of heating of the water in the bowls. The advantage of this thermostatic circuit breaker is as in the case of contacts 37 and 38, Fig. 3, that any premature jolting or shaking during the placing or setting up of the coffee maker will not affect the control until after the thermal strip 89 has been heated to a predetermined degree, which is set to take place only during the latter stages of the coffee brewing process, that is, when the water nears the boiling point, for at that time it is very unusual for the coffee maker to be disturbed. This thermal safety may or may not be included in the circuit.

Figure 7:
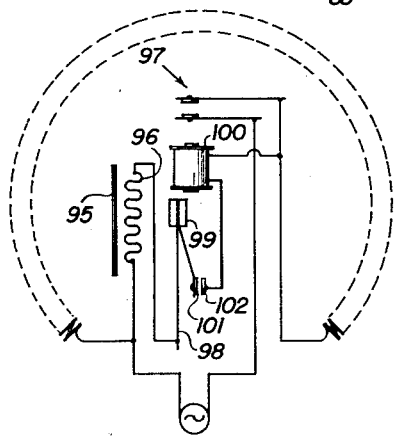
Fig. 7 is an alternate electrical hookup of the assembly.

In Figure 7 is illustrated a circuit diagram substantially simplified over that shown in Figure 3. In the diagram of Figure 7 the thermal strip corresponding to the thermal strip 30 of Figure 3 is shown slightly remote from the resistor 19, and which latter corresponds to the resistor 31 of Figure 3. The other elements specifically referred to by numerals in Figure 7 have their counterpart in Figure 3, it being readily apparent that the control 97 of Figure 7 corresponds to the control 48 of Figure 3, the vibratory contact member or arm 98 corresponding to the arm 41 of Figure 3, the weight 99 corresponding to the weight 54 of Figure 3, the holding magnet 100 corresponding to the magnet 45 of Figure 3, and the contacts 101 and 102 corresponding to the contacts 43 and 44 of Figure 3. It will be apparent that the device as disclosed in Figure 7 operates substantially in the manner in which the device of Figure 3 operates, and that the only difference is that in the form of the invention in Figure 7 the thermal strip 95 is in close proximity to the resistor 19 rather than having the resistor wrapped around the thermal strip as is the case with the disclosure of Figure 3.

What I do claim of this invention and desire to secure by Letters Patent is:

1. A coffee maker comprising a first vessel for heating water, a second vessel for infusing coffee, a liquid transfer tube connecting said vessels, a resiliently mounted support for said vessels, an electric heating element disposed in said support, a switch disposed in said support and arranged in electrical circuit with the heating element for controlling said circuit, said switch having an "on" position and an "off" position, latch means operatively engageable with the switch for releasably retaining the latter in an "on" position, a bimetallic strip mounted in operative position to said latch and movable when heated to move the latch to a position releasing said switch, a heating resistor mounted in close proximity to said metallic strip, an energizing circuit connected with the resistor, and a vibrative assembly mounted in said support and including circuit making and breaking means arranged in said energizing circuit for completing the latter to maintain a circuit through the resistor to thereby heat said bimetallic strip.

2. A coffee maker comprising a first vessel for heating water, a second vessel for infusing coffee, a liquid transfer tube connecting said vessels, a resiliently mounted support for said vessels, an electric heating element disposed in said support, a switch disposed in said support and arranged in electrical circuit with heating element for controlling said circuit, said switch having an "on" position and an "off" position, latch means operatively engageable with the switch for releasably retaining the latter in an "on" position, a bimetallic strip mounted in operative position to said latch and movable when heated to engage the latch and move the latter to a position releasing said switch, a heating resistor mounted in close proximity to said metallic strip, an energizing circuit connected with the resistor, and a vibrative assembly mounted in said support and including circuit making and breaking means for completing said energizing circuit and magnetic means for retaining the circuit completed through the resistor so that the latter may heat said bimetallic strip.

GEORGE B. DAVIS, Jr.

REFERENCES CITED

The following references are of record in the file of this patent:

UNITED STATES PATENTS

| Number | Name | Date |
| --- | --- | --- |
| 1,063,369 | McElroy | June 3, 1913 |
| 1,146,637 | Massa | July 13, 1915 |
| 1,994,323 | Peirce | Mar. 12, 1935 |
| 2,179,811 | Brossean | Nov. 14, 1939 |
| 2,198,133 | Smith | Apr. 23, 1940 |
| 2,223,450 | Jepson et al. | Dec. 3, 1940 |
| 2,262,279 | Gomersall et al. | Nov. 11, 1941 |
| 2,287,583 | Weeks | June 23, 1942 |
| 2,367,500 | Huck | Jan. 16, 1945 |
| 2,385,694 | Davis | Sept. 25, 1945 |
| 2,402,163 | Huenergardt | June 18, 1946 |